US006496878B1

(12) United States Patent
Azevedo et al.

(10) Patent No.: US 6,496,878 B1
(45) Date of Patent: Dec. 17, 2002

(54) TRANSFER PROGRESS ALERT MODULE

(75) Inventors: Michael Joseph Azevedo, San Jose, CA (US); Roger Gregory Hathorn, Tucson, AZ (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/432,661

(22) Filed: Nov. 3, 1999

(51) Int. Cl.[7] .............................................. G06F 13/28
(52) U.S. Cl. ........................... 710/22; 710/15; 710/20; 710/48; 710/64; 711/150; 711/169
(58) Field of Search .............................. 710/1, 6, 7, 15, 710/19, 20, 21, 22, 23, 27, 31, 46, 47, 48, 62, 64, 72, 201; 711/150, 169

(56) References Cited

U.S. PATENT DOCUMENTS

| | | | |
|---|---|---|---|
| 5,055,841 A | 10/1991 | Cordell | |
| 5,287,476 A | 2/1994 | Keener et al. | |
| 5,305,441 A | 4/1994 | Okochi et al. | |
| 5,560,030 A | 9/1996 | Guttag et al. | |
| 5,581,790 A | 12/1996 | Sefidvash | |
| 5,615,382 A | 3/1997 | Gavin et al. | |
| 5,692,200 A | * 11/1997 | Carlson et al. | 710/262 |
| 5,717,932 A | 2/1998 | Szczepanek et al. | |
| 5,761,478 A | 6/1998 | Chen et al. | |
| 5,784,649 A | 7/1998 | Begur et al. | |
| 5,809,552 A | 9/1998 | Kuroiwa et al. | |
| 5,850,571 A | 12/1998 | Odom et al. | |
| 5,905,911 A | 5/1999 | Shimizu | |
| 6,002,814 A | * 12/1999 | Chadez | 382/303 |
| 6,032,213 A | * 2/2000 | Gulick | 710/129 |
| 6,044,414 A | * 3/2000 | Gulick | 710/22 |
| 6,301,632 B1 | * 10/2001 | Jaramillo | 710/129 |

* cited by examiner

Primary Examiner—Jeffrey Gaffin
Assistant Examiner—Rijue Mai
(74) Attorney, Agent, or Firm—Oppenheimer Wolff & Donnelly LLP

(57) ABSTRACT

A Transfer Progress Alert Module and a method for optimizing processing of a data transfer load, in a data communication system is provided. The data transfer load is divided in individual data blocks. The device and method simultaneously perform pipelined operations on different individual data blocks, thus optimizing the overlap of pipelined operations. The method includes initializing the transfer by selecting a pre-defined individual data block size and determining a key for selecting and monitoring transfers with transfer addresses within a pre-determined address region. The method then continuously repeats following steps until all monitored individual data blocks from the data transfer load are processed. First, the incoming individual data blocks are transferred on a bus between a peripheral device and a memory, and the Transfer Progress Alert module is used for monitoring the individual data blocks having transfer addresses determined to belong in the pre-determined address region. The TPA module is used to determine when each monitored transferred individual data block is ready for a post-processing operation, at least one post-processing operation is performed on the data, and the processed data is transferred to a peripheral device. The method and device may also be adapted for performing an error detection operation on the monitored individual data blocks transferred on the bus, for ascertaining the integrity of the transferred data.

30 Claims, 5 Drawing Sheets

TRANSFER PROGRESS ALERT MODULE

BACKGROUND OF THE INVENTION

1. Field of the Invention

This invention relates in general to data communication systems, and in particular to high performance data communication systems having a Transfer Progress Alert (TPA) module in a peripheral interface adapter supporting pipelined operations, to create an alert condition when a pre-specified amount of data has been transferred on the internal system bus.

2. Description of Related Art

Digital communication over a communication channel is well known in the art. Modern data communication systems often have multiple high performance data processors and generally include a plurality of peripheral interfaces connected to the data processors by one or more internal buses. High performance bus architectures, such as the PCI bus architecture, provide a hardware mechanism for transferring large sequential groups of data between a peripheral interface and a processor's memory, via burst cycles.

Applications which move large data blocks from an external interface to memory space and from memory space to storage media often break this transfer into smaller, individual blocks to achieve more overlapping of event processing in an effort to improve system response time. The pipelined operations on smaller data blocks are specifically desired in systems where data are buffered prior to transfer elsewhere in the system, or where an intermediate data reformatting or data compression on the data in a memory is required, prior to its transfer to the storage medium, which may be a magnetic device such as tape or disk. Thus processing the data in individual blocks enables pipelined operations, allowing such operations as transfer of incoming blocks, post-processing steps, and transfer to storage media to occur on different data blocks simultaneously. This creates a much more efficient data transfer process than storing the entire large data block in the memory, followed by the entire block post-processing, and subsequent sending the entire data block to the storage medium.

However, processing smaller, individual blocks of data, although providing overall efficiency advantages, presents a problem for the post-processing operation control software to determine when exactly a given block is ready for its post-processing step. Therefore, there is a need in a peripheral interface adapter for a Transfer Progress Alert (TPA) module, which can create an alert signal when a pre-specified amount of data has been transferred on the internal system bus, to insure timely start of a pipelined operation on the transferred individual block of data for effective processing.

SUMMARY OF THE INVENTION

The foregoing and other objects, features, and advantages of the present invention will be apparent from the following detailed description of the preferred embodiments which makes reference to several drawing figures.

One preferred embodiment of the present invention is a data communication system for fast processing of a data transfer load, divided in individual data blocks. The processing is optimizing the overlap of pipelined operations, including data transfers and post-processing performed on individual data blocks. The system includes at least one peripheral interface adapter having an internal bus connected to a peripheral interface, a DMA channel connected to the internal bus facilitating the DMA transfer of individual data blocks, and a Transfer Progress Alert (TPA) module connected to the internal bus. The system further includes a bridge placed between the internal bus and at least one external bus. Each external bus is connected to a data storage device, a main memory, and a main processor. The bridge is connecting a processor, a post-processing module and a memory.

The internal bus is transferring individual data blocks between the peripheral interface and the memory. The TPA module is determining when each of the transferred individual data blocks has been transferred on the internal bus and is ready for a post-processing operation in the post-processing module. The pipelined operations occur on different individual data blocks simultaneously, and include transferring incoming individual data blocks, at least one post-processing operation, and transferring the processed data, until all individual data blocks from the data transfer load are processed. The TPA module further generates an interrupt alerting a TPA control software, executed in the processor. The control software initializes the TPA module and the DMA channel with the pre-defined individual data block size, starting address and direction control.

The individual data blocks having customer-defined data are assigned to the internal bus addresses in a pre-determined address region, and the TPA module and control software monitor transfers in that particular address region and ignore transfers in other address regions. The TPA module may also include an error detection module for performing an error detection operation on the customer-defined data transferred on the internal bus, for ascertaining the integrity of the transferred data. The post-processing operation may include buffering, data reformatting, data compression or decompression.

Another preferred embodiment of the present invention is a peripheral interface adapter in a data communication system for fast processing of a data transfer load, divided in individual data blocks. The processing is optimizing the overlap of pipelined operations, including data transfers and post-processing performed on individual data blocks. The adapter is connected to a bridge attached to an external bus connected to a data storage device, a main memory, and a main processor. The bridge connects a processor, a post-processing module and a memory. The adapter includes an internal bus connected to a peripheral interface and a DMA channel connected to the internal bus assisting in the DMA transfer of individual data blocks. It also includes a Transfer Progress Alert (TPA) module connected to the internal bus. The internal bus transfers individual data blocks between the peripheral interface and the memory. The TPA module determines when each transferred individual data block is ready for a post-processing operation in the post-processing module. The pipelined operations are occurring on different individual data blocks simultaneously, and include transferring the incoming individual data blocks, at least one post-processing operation, and transferring the processed data, until all individual data blocks from the data transfer load are processed.

Yet another preferred embodiment of the present invention is a method for optimizing processing of a data transfer load, divided in individual data blocks, by simultaneously performing pipelined operations on different individual data blocks, thus optimizing the overlap of pipelined operations. The method is being used in a data communication system and includes the following steps: (a) initializing the TPA module with a pre-defined individual data block size and determining a key for selecting and monitoring transfers with transfer addresses within a pre-determined address region; and (b) continuously repeating following steps until all monitored individual data blocks from the data transfer load are processed: (c) transferring incoming individual data blocks on a bus between a peripheral device and a memory, (d) monitoring in a Transfer Progress Alert (TPA) module, connected to the bus, the individual data blocks having transfer addresses determined to belong in the pre-determined address region; (e) determining in the TPA module when each monitored transferred individual data block is ready for a post-processing operation; (f) generating an interrupt alerting a TPA control software to start the post-processing operation and keeping an interrupt line transferring the interrupt active, until all individual data blocks from the data transfer load are post-processed; (g) performing at least one post-processing operation; and (h) transferring the processed data to a peripheral storage device.

The method further includes a step for performing an error detection operation on the monitored individual data blocks transferred on the bus, for ascertaining the integrity of the transferred data. The error detection operation includes a creation of a resultant checksum obtained by performing an EXCLUSIVE-OR (XOR) operation on the corresponding bits of the newly transferred data and a stored resultant checksum from the previous data transfers.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention discloses a scheme and apparatus for optimizing the transfer and management of data in pipelined operations. In the following description numerous details, such as specific memory sizes, bandwidths, data paths, etc., are avoided because it is apparent to one skilled in the art that these specific details are not essential to the practice of the present invention. In particular, the present invention can readily be used in conjunction with a wide variety of data communication system components and bus types, each bus having its own unique protocol, bandwidth, and data transfer characteristics. It is further noted that well known electrical structures and circuits are shown in block diagram form, in a number of figures, in order not to obscure the present invention unnecessarily.

As will be described, the preferred embodiments of the present invention utilize an improved pipelining algorithm for high performance data communication systems, which may be implemented in a data storage medium server, such as a magnetic tape server. According to this algorithm the system processors are freed to proceed with other tasks within the system, such as task management. The configuration minimizes the amount of time that data from a particular source must wait to be post-processed, and thus minimizes latency. It also permits the block size to be changed dynamically.

Figure 1:
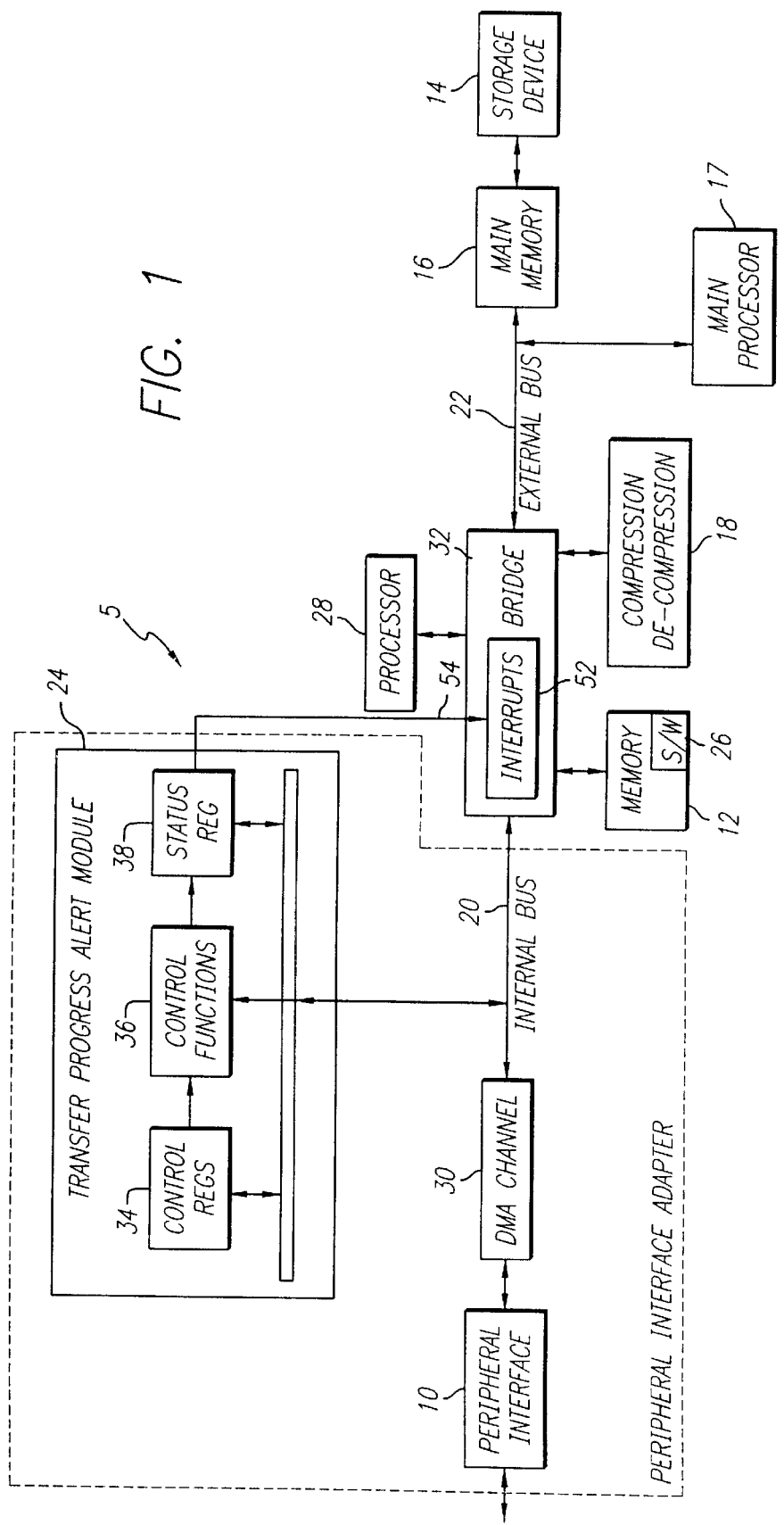
FIG. 1 illustrates a block diagram of an exemplary embodiment of the present invention of a data communication system incorporating a peripheral interface adapter circuit with an exemplary Transfer Progress Alert (TPA) module of the present invention.

FIG. 1 illustrates, in a form of a block diagram, an exemplary embodiment of the present invention of a data communication system incorporating a peripheral interface adapter circuit 5 with a Transfer Progress Alert (TPA) module 24. The TPA module 24 can create an alert signal when a pre-specified amount of data has been transferred on an internal system bus 20 to a memory 12, to insure timely start of a pipelined operation on the transferred block of data, for effective post-processing or buffering. The FIG. 1 architecture, having the TPA module 24 only on the internal bus 20, is useful for write DMA operation, when the post-processing is data compression. If it is desired to create an alert signal when a pre-specified amount of data has been transferred on another bus, such as an external bus 22, to insure timely start of a pipelined operation on the transferred block of data, read into the memory 12 for de-compression, a TPA module should be connected to the external bus 22. Some embodiments may have a TPA module on its internal bus 20 and a TPA module on its external bus 22.

The exemplary embodiment shown in FIG. 1 is designed for pipelined operations, and each large data block of data from an external peripheral interface 10 is broken into smaller, individual blocks which are transferred via the internal bus 20 into the memory 12 space. Each individual block is post-processed and afterwards the data is transferred from the memory 12 space into a storage device 14, via the external bus 22 and a main system memory 16. This architecture and method allow overlapping of data buffering stages, so that the data from a transfer load can be divided into small blocks, each such block individually buffered prior to transfer elsewhere in the system. The preferred embodiments of the present invention allow overlapping of post-processing steps performed on individual data blocks, in an effort to improve response time. The post-processing may include, for example, data reformatting or data compression, preferably accomplished in this example in a compression/de-compression module 18, on the data from the memory 12, required to occur prior to data transfer to the storage device 14. The pipelined operation allows transfer of incoming individual data blocks, post-processing operations, and transfer of processed data into the storage device 14 to occur on different data blocks simultaneously.

The Transfer Progress Alert (TPA) module 24 is a hardware circuit, preferably implemented in an ASIC, associated with the peripheral interface adapter 5 and adapted to support transfer of data from the peripheral interface 10 to the memory 12. The TPA module 24 is connected to the internal bus 20 and provides an alert signal to a TPA control software 26, consisting of program instructions, thereby alerting it that an individual block is ready for its post-processing step. The TPA control software 26, is preferably a TPA device driver, which receives an interrupt when a pre-specified amount of data has been transferred on the internal bus 20. The control software 26 is preferably located in the memory 12 and executed in a processor 28. It receives information and controls the DMA channel 30 connected to the internal bus 20. The processor 28 is connected to the internal bus 20 via a bridge 32. The bridge 32 is connected to the external bus 22, the memory 12 and the compression/de-compression module 18. A main processor 17 is connected to the external bus 22.

The primary task of the bridge 32, utilized in the host adapter 5 of the present invention, is to allow data to cross from one bus to the other bus without diminishing the performance of either bus. To perform this function, the bridge must understand and participate in the bus protocol of each of the buses. In particular, the bridge can accept an interrupt request from a first bus, such as the internal bus 20, then initiate an appropriate bus operation on a second bus, such as the external bus 22. The bridge must, therefore, provide support for accesses crossing from one bus to the other.

In the present invention the internal bus is preferably an i960 bus and the external bus 22 is preferably of a peripheral component interconnect (PCI) bus type. In this case the bridge 32 may be connected to several external buses 22 and several internal buses 20. In this generalized preferred embodiment of the present invention the processor 28 may be supporting several subsystems, each having a peripheral interface adapter 5, and several main memories 16 and storage devices 14.

The system main memory 16 is preferably a cache memory. It may he a Synchronous Dynamic Random Access Memory (SDRAM), which is a high performance memory structure with clocked or pipelined interface. The peripheral interface 10 is preferably an ESCON interface. It also may be the small computer systems interface (SCSI) interface or Fibre Channel interface. However, it is noted that the present invention may be incorporated into any of various types of systems including various types of buses, and other system and peripheral components, as desired. For example, instead of the PCI local bus, it is noted that other local buses may be used, such as the VME bus.

The PCI bus was designed to have a high throughput and to take advantage of the increasing number of local processors that support host I/O functions. For example, most disk controllers, particularly SCSI controllers, and network interface cards (NICs) include a local processor to relieve demands on the host processor. Typically these devices have the capability of operating as bus masters, to allow them to transfer data at the highest possible rates. In the high performance data communication system of FIG. 1 the peripheral interface adapter circuit 5 acts as a PCI bus interface supporting the processor 28, acting as an ESCON or SCSI controller, and operating as the external bus 22 master, to perform transfers on that bus. The publication PCI System Architecture by Tom Shanley and Don Anderson, available from Mindshare Press, 2202 Buttercup Dr., Richardson, Tex. 75082 (214) 231-2216, is hereby incorporated by reference in its entirety. For more details on the PCI bus, reference to the PCI Standard Version 2.1, from the PCI Special Interest Group in care of Intel Corp., which is hereby incorporated by reference, is advised.

In the present invention the internal bus 20 is preferably utilized in applications which move a transfer load, consisting of a large data block, from the external peripheral interface 10 to the memory 12 space. It is desirable to divide each such large block of data into smaller, individual blocks to achieve more overlapping of operations, including data transfer and post-processing events, in an effort to improve response time. The TPA 24 module and its control software 26 are adapted to determine when a transferred individual block is ready for its post-processing step.

Figure 3:
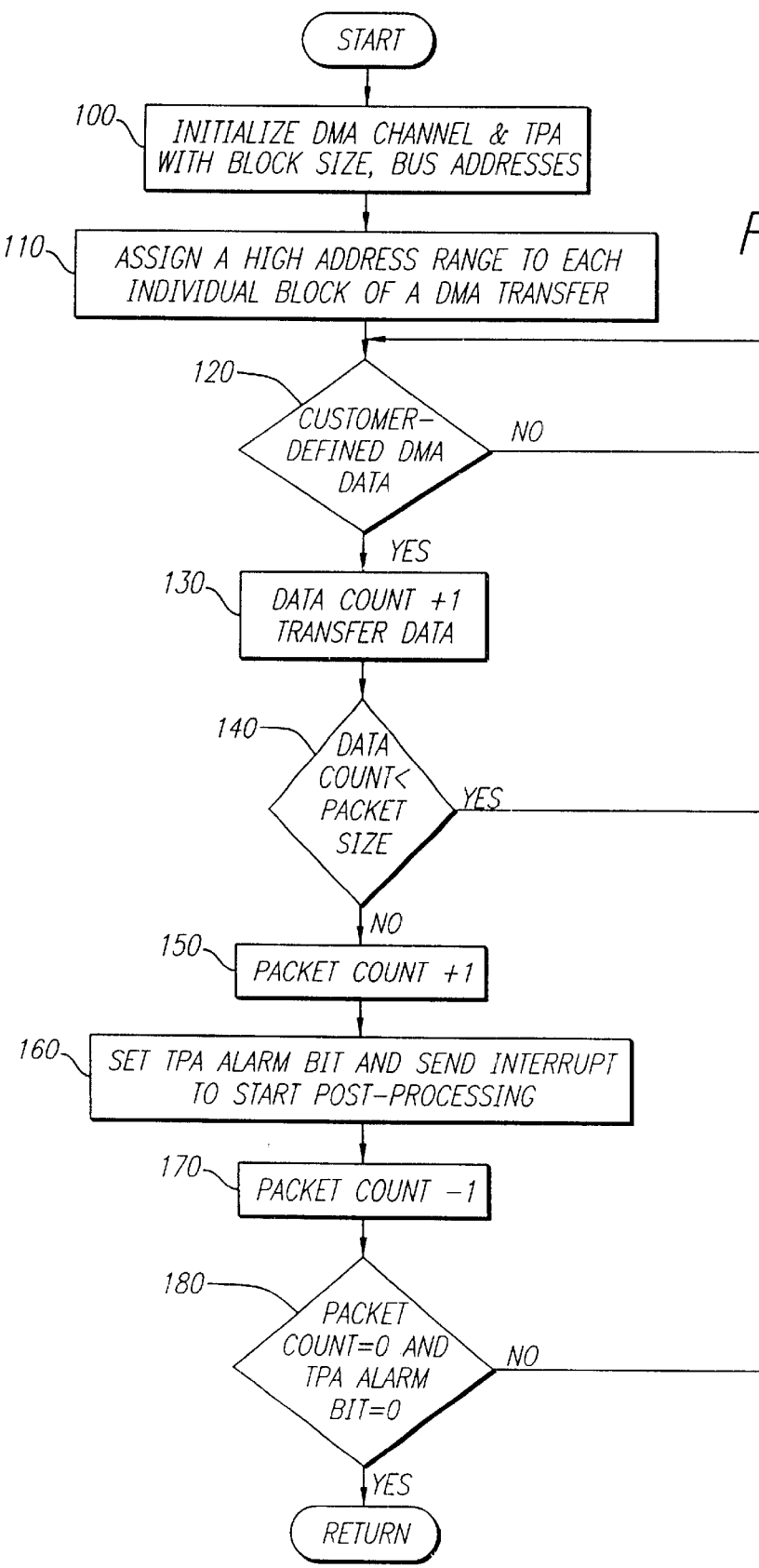
FIG. 3 illustrates a flowchart describing the steps involved with transfer of a large data block via the internal bus, supported by the TPA hardware and its control software, according to the present invention.

FIG. 3 illustrates a flowchart describing the steps involved with a transfer of a large data block via the internal bus 20, supported by the TPA 24 module hardware and its control software 26. Prior to the large data block transfer, the control software 26 initializes the TPA module 24, in block 100, with the desired pre-defined individual data block size. As part of this initialization step, the control software 26 initializes the DMA channel 30 for the DMA transfer, which may be a read or write operation, the total DMA block size equal to the large data block size of the transfer load. The DMA channel 30 also receives the information on the type of data being transferred and a particular internal bus 20 address region assigned to this data transfer, so that the TPA module 24 can monitor transfers in that particular address region and ignore transfers in other address regions. For this purpose certain registers within the TPA module 24 are set up during the initialization step, such as snoop a key register 42 and data block size register 40.

In the present invention, short burst transfers occur between the processor 28 and the internal bus 20 and preferably move between one and eight control command words. Short burst transfer requests contain both the request command and message data, such as I/O addresses. The system and method of the present invention also supports long burst direct memory access (DMA) transfers between the memory 12 and the main memory 16, via the external bus 22, and from the peripheral interface 10 to the memory 12, via the internal bus 20. The long burst DMA transfers are initiated in the peripheral interface adapter circuit 5, by the DMA channel 30. Long burst transfers include voluminous data and the request control information for each DMA operation, consisting of data count, target address and transfer direction is saved by the control software 28 within a determined area of the memory 12, to be accesses by the DMA channel 30 prior to each transfer.

In the preferred embodiments of the present invention only the long burst transfers are monitored by the TPA 24, because only customer-defined data are being post-processed in the module 18, and short burst control command transfers are ignored. Thus, in this example, transfers of blocks of customer-defined data are preferably assigned to the internal bus 20 addresses in a high address region, above certain pre-determined address, and low address region is used for control command transfers. The TPA control software 26 monitors whether the internal bus 20 is addressing the control command address region, and if so, it does not count the blocks of data from that transfer type in its TPA 24 module. It is well known in the art that the customer-defined data may be dedicated any other address region, or may be assigned and marked with a special flag.

Figure 2:
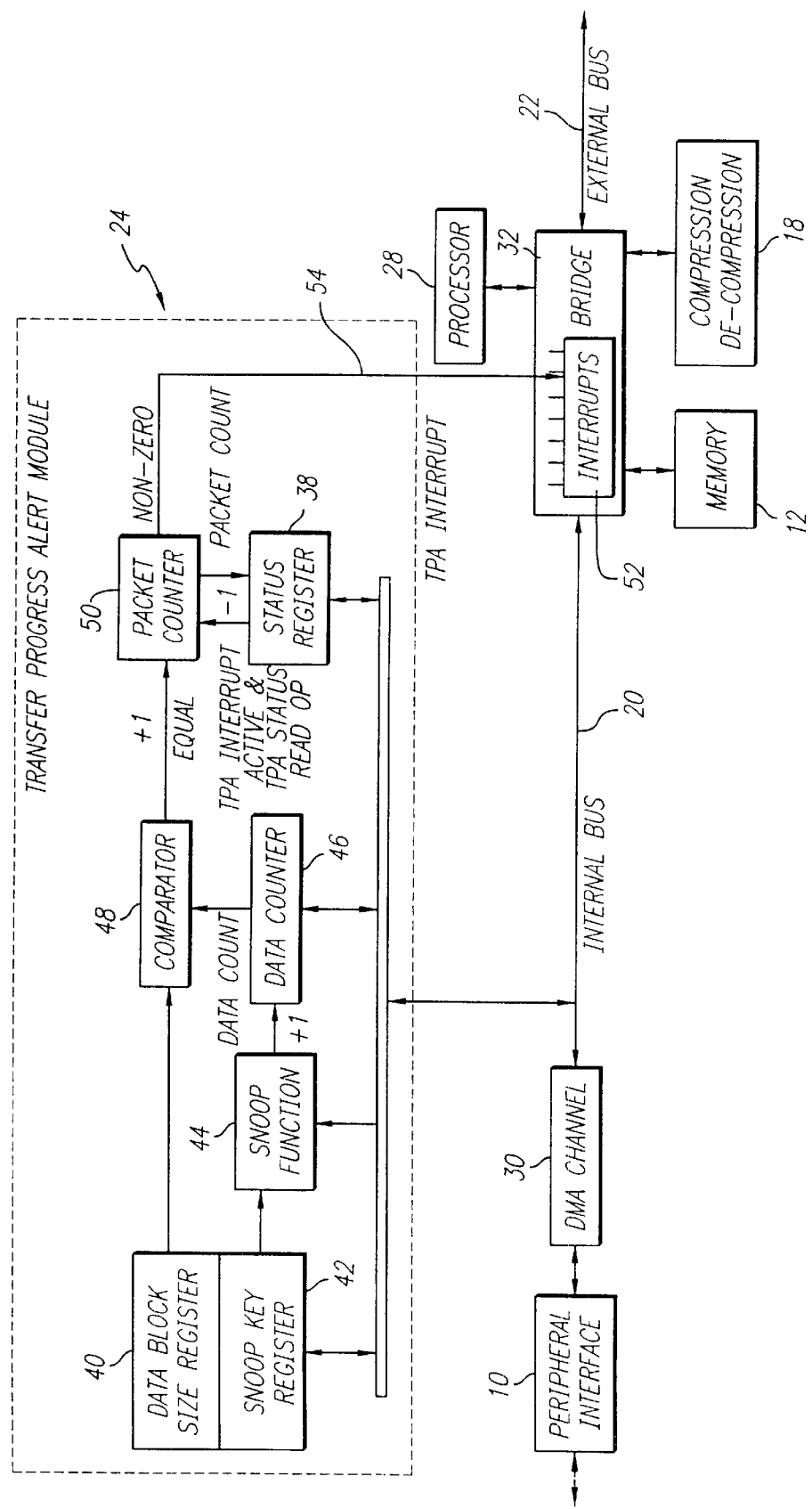
FIG. 2 illustrates a detailed block diagram of the TPA embodiment of the present invention shown in FIG. 1.

For this purpose the TPA module 24 is equipped with control registers 34, control function circuits 36 and a status register 38. These elements of the TPA module 24 are shown in detail in FIG. 2. The control registers 34 include a data block size register 40 and a snoop key register 42. The control function circuits 36 include a snoop function element 44, a data counter 46, a comparator 48 and a packet counter 50. The bridge 32 includes an interrupt register 52.

In step 110 of FIG. 3 the transfer load block is assigned the dedicated address region, and thus each individual block is assigned a specific address range of the dedicated address region. Therefore, only the transfers within this specified dedicated address region are tagged for the mode of operation handled by the TPA module 24. In block 120, for each transferred data quantity of the pre-defined size, simultaneously transferred on the internal bus 20 lines, the TPA module 24 monitors the transfer and increments the data counter 46, in block 130, by the number of data bytes transferred, if the snoop function element 44 determines from the address range that this is customer-defined data. The snoop function element 44 module enables counting of the customer-defined data, if in the proper address range, and disallows counting of control command data.

In order to accomplish this task the snoop function element 44 monitors address and control lines of the internal bus 20 and compares the pre-determined address bits with the key saved in the snoop key register 42, to determined whether the data being transferred on the data lines of the internal bus 20, corresponding to these address lines, is of the customer-defined data type. Preferably, the key held in the snoop key register 42 is a mask consisting of three bits, used for comparison with the three highest bits of the address, preferably consisting of 32 bits, if the customer-defined data are assigned to the internal bus 20 addresses in a high address region.

The pre-defined individual data block size is saved in the data block size register 40. When the data counter 46 reaches the pre-specified data block size, equal to packet size, as determined in the comparator 48 in block 140, the packet counter 50 is incremented by one. At that moment, in block 160, a Transfer Progress Alert is signaled, by setting its corresponding bit in the status register 38 to a logic value "1", to inform the control software 26 that the packet counter 50 has a non-zero value. The presence of the alert indicates that one or more blocks are ready for the post-processing step. The control software 26 has access to the state of the Transfer Progress Alert bits in the status register 38, and uses this register 38 and the packet counter 50 as a task queue.

When the status register 38 changed the status of Transfer Progress Alert bit to logic "1", an interrupt is sent on an interrupt line 54 to the bridge interrupt register 52. When the processor 28 control software 26 acknowledges the interrupt, it reads the bridge interrupt register 52 to determine the interrupt type and the device that caused the interrupt.

If the device is determined to be the TPA 24, the control software 26 reads the status register 38 Transfer Progress Alert bit, to confirm that it is set to logic "1". In this case the number of packets in the packet counter 50 is decremented by 1, in block 170, which represents the de-queuing of a task from the task queue. The interrupt signals that the data packet is ready for post-processing, such as data compression or de-compression, performed in the compression/de-compression module 18.

The interrupt line 54 can be pulsed or DC level line. Once the packet counter 50 is decremented by 1, in block 1 70, in the pulsed interrupt line embodiment, the interrupt line 54 is de-asserted is re-asserted again, if there are more tasks in the task queue. In the DC level embodiment, the control software 26 cannot succeed in resetting the interrupt line 54, until the task queue becomes empty. The interrupt line 54 stays active until the task queue becomes empty, indicated by the status register 38 alarm bit having zero value and packet counter 50 having zero value, as determined in step 180, and all data blocks from the transfer load have been post-processed. In case of a transfer error, detected by the DMA channel 30, an interrupt is sent on another interrupt line to the interrupt register 52, to notify the control software 26 of the error.

The alert mechanism of the preferred embodiments of the present invention provides a faster and more efficient means for the control software 26 to determine when the individual data block is ready for the post-processing step. It reduces the overhead between the steps of processing the individual blocks, by eliminating the traditional DMA channel 30 processing steps, such as a block setup, typically performed in conventional systems for each individual data block. In the preferred embodiments of the present invention the setup is done only once, at the beginning of transfer of the whole transfer load, and there is no need for additional setup steps before the transfer of each individual block.

Further, in the preferred embodiments of the present invention the writing and reading of control command data by the control software 26 and TPA module 24 is not performed, since these transfers are not tagged and the interrupt line 54 is not set for these transfers, but only for the customer-defined data transfers. Thus, the present invention has a benefit of eliminating the interference during the customer-defined data transfers by the control command data transfers on the internal bus 20. Further, because there is no interrupt sent to the interrupt register 52 for the control command data transfers, the control software 26 is not invoked to process these transfers, which allows the processor 28 to continue handling other high priority tasks and return to the Transfer Progress Alert module 24 task queue at some later time. This is possible because the task queue preserves the hardware state of the TPA module 24 at any point in time, until the value is changed, and thus is always showing a tally of the number of block transfers performed in the packet counter 50. If the packet counter 50 has a non-zero value, this indicates that there are event tasks still pending in the task queue. The design of the present invention allows better overlap of the steps involved in the receipt of incoming individual data blocks with the post-processing steps performed on the data blocks, more parallel activity between the processing steps, and lower control software 26 overhead between the individual blocks, allowing faster transfer completion of the entire transfer load.

Figure 4:
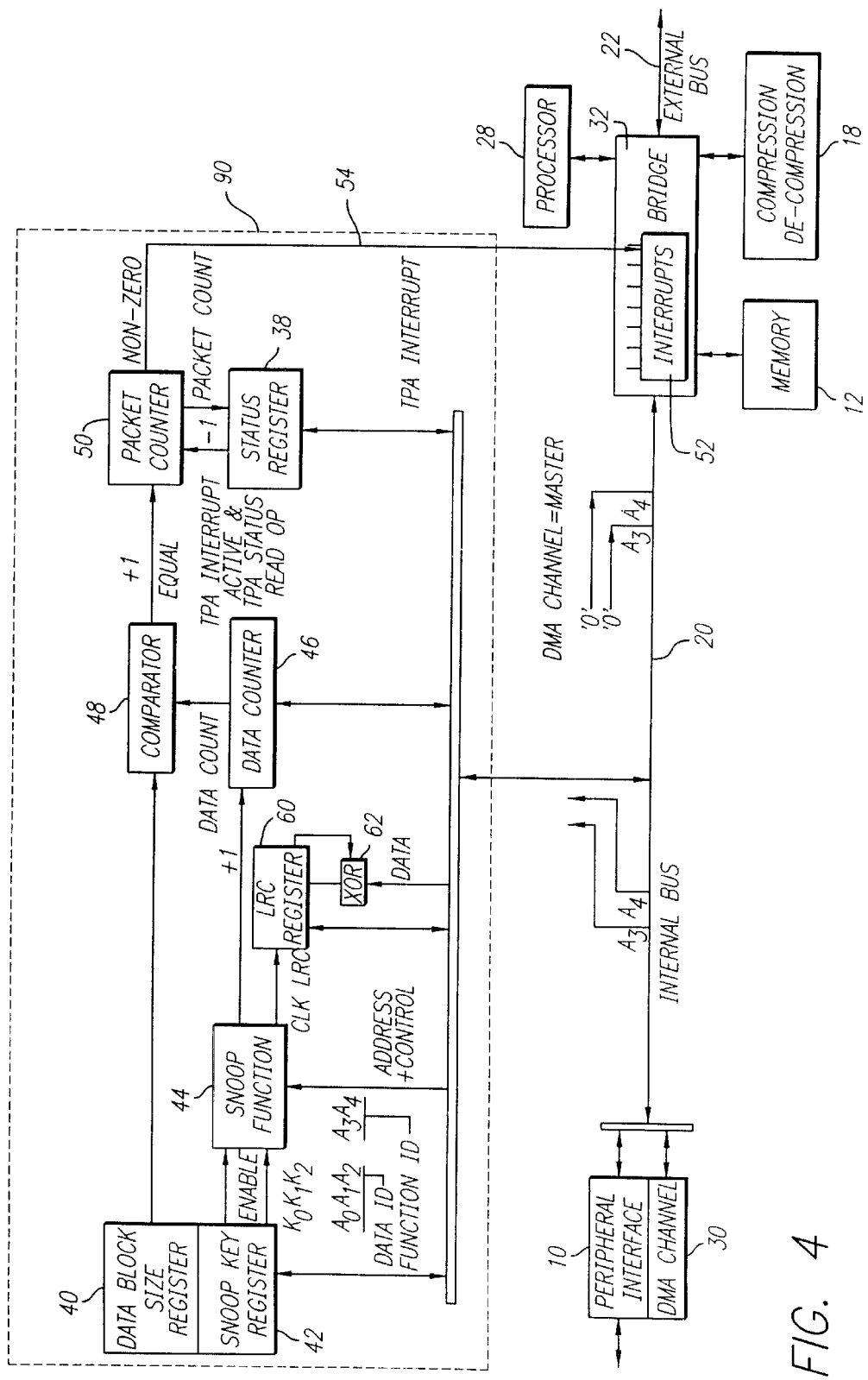
FIG. 4 illustrates a block diagram of another exemplary embodiment of the present invention of a data communication system incorporating a peripheral interface adapter circuit with another exemplary Transfer Progress Alert (TPA) module of the present invention able to perform error detection.

In yet another preferred embodiment of the present invention, illustrated in a block diagram of FIG. 4, an error detection, preferably via a checksum may be performed on-the-fly by the improved TPA module 90 on the customer-defined data transferred on the internal bus 20. In this embodiment an EXCLUSIVE-OR (XOR) operation is performed on the transferred data to ascertain the integrity of the transferred data, by determining whether some data were lost or corrupted. For this purpose one of two control bits on the address and command lines of the internal bus 20, preferably bit 27 is dedicated to this control function. Bit 28 is preferably dedicated to the data counting function, described previously. These bits are set by the DMA channel 30 before they are sensed by the TPA module 90. Thus, the status of these two bits will inform the TPA module 90 which of these two functions to perform. If both bits are set, both the data counter and the XOR function will be performed by the TPA module 90. If none of these bits are set, the TPA module 90 will not perform these functions. The control lines corresponding to these two bits are reset by the DMA channel 30 before the corresponding data is transferred to the memory 12, to prevent address corruption and keep the data in contiguous memory locations. The TPA data counting function may be disabled by turning the bit 28 off, or by sending data outside the address range covered by the snoop key register 42 mask.

A Longitudinal Redundancy Code (LRC) register 60 is synchronized to receive the customer-defined data from the internal bus 20 data lines corresponding to the address and control lines of the internal bus 20 checked by the snoop function 44 element. The new data bits are XOR-ed in an XOR register 62 with the bits of the resultant checksum, a result of XOR operation on all previous words, to create a new checksum across all bit positions. The resultant error detection code signature in form of the resultant checksum of the whole block is later compared with the original block checksum to check for a possible mismatch. This mode of operation can be disabled by turning the bit 27 off, for example, when data blocks are transmitted without the original checksum. It can also be disabled by sending data outside the address range covered by the snoop key register 42 mask. The LRC register 60 can be used for error detection in both data transfer directions, read and write, performed on the internal bus 20.

Figure 5:
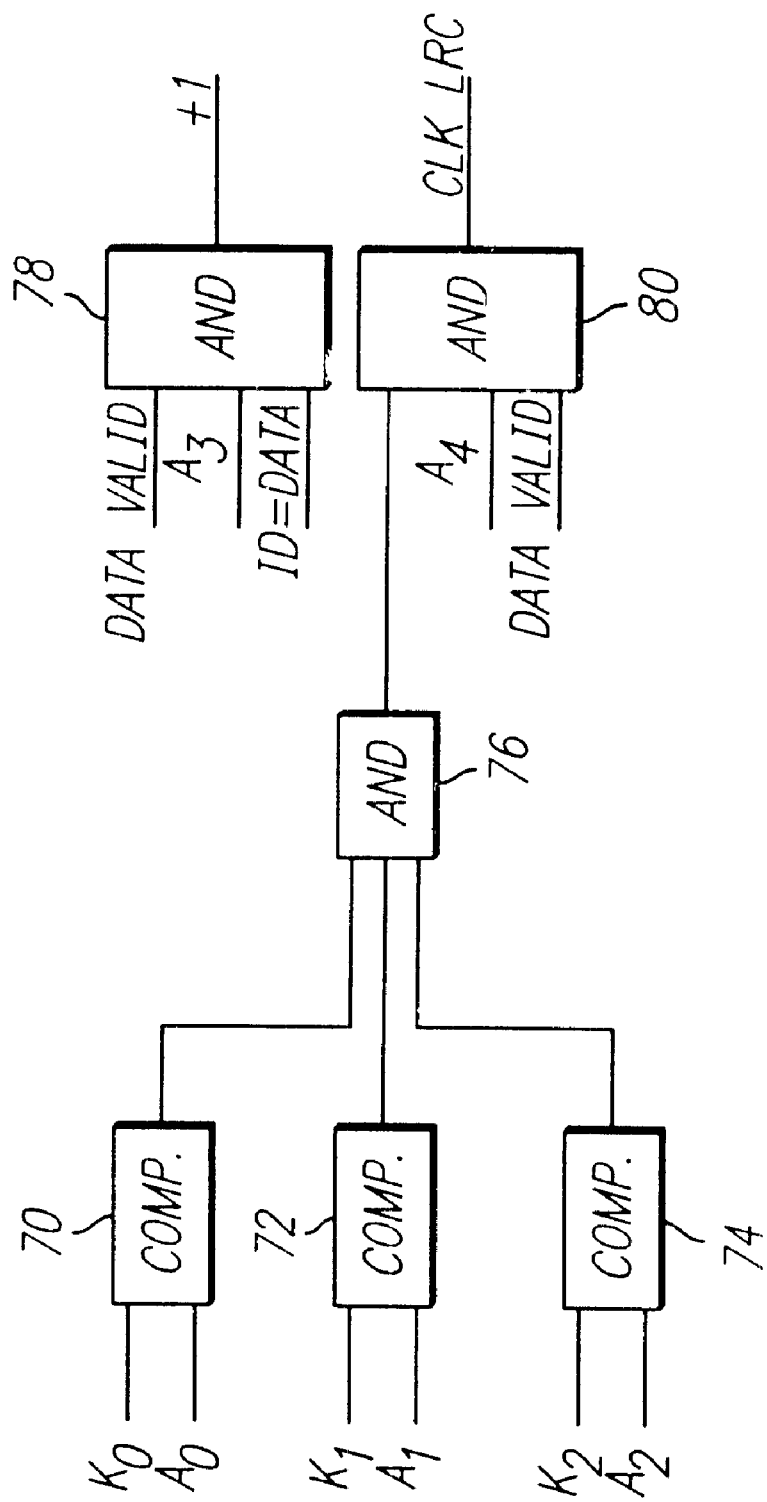
FIG. 5 illustrates a detailed block diagram of the snoop in function element of the TPA embodiment shown in FIG. 4.

FIG. 5 illustrates a detailed block diagram of the snoop function 44 element, consisting of several comparators 70, 72, 74 and AND gates 76, 78, 80, used for address and control bit testing, as previously described.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A data communication system for fast processing of a data transfer load, divided individual data blocks, said processing optimizing the overlap of pipelined operations including data transfers and post-processing performed on individual data blocks, said system comprising:
    at least one peripheral interface adapter having:
        an internal bus connected to a peripheral interface,
        a DMA channel connected to the internal bus assisting in the DMA transfer of individual data blocks, and
        a Transfer Progress Alert (TPA) module connected to the internal bus; and
    a bridge placed between the internal bus and at least one external bus, each said external bus connected to a data storage device, a main memory, and a main processor, wherein
    said bridge connecting a processor, a post-processing module and a memory;
    said internal bus transferring individual data blocks between the peripheral interface and the memory;
    said TPA module determining when each said transferred individual data block being transferred on the internal bus and ready for a post-processing operation in the post-processing module; and
    the pipelined operations occurring on different individual data blocks simultaneously, and including transferring incoming individual data blocks, at least one post-processing operation, and transferring the processed data, until all individual data blocks from the data transfer load are processed.

2. The system according to claim 1, wherein the TPA module further generating an interrupt alerting TPA control program instructions, executed in the processor, said control program instructions initializing the TPA module, and the DMA pre-defined individual data block size and addresses in the DMA channel, and controlling the DMA channel.

3. The system according to claim 2, wherein the individual data blocks having customer-defined data being assigned to the internal bus addresses in a pre-determined address region, and said TPA module and control program instructions monitoring transfers in that particular address region and ignoring transfers in other address regions.

4. The system according to claim 3, wherein the TPA module further comprises:
    an error detection module for performing an error detection operation on the customer-definded data transferred on the internal bus, for ascertaining the integrity of the transferred data.

5. The system according to claim 1, wherein said external bus being a peripheral component interconnect (PCI) bus.

6. The system according to claim 1, wherein the peripheral interface being an ESCON interface.

7. The system according to claim 1, wherein the data communication system being a data storage medium server.

8. The system according to claim 1, wherein the post-processing operation including data reformatting.

9. The system according to claim 1, wherein the post-processing module having a data compression module and the post-processing operation including data compression, performed on the data transferred from the peripheral interface to the memory, prior to data transfer to the storage device.

10. The system according to claim 1, further comprises a second Transfer Progress Alert (TPA) module connected to the external bus, wherein the post-processing module having a data de-compression module and the post-processing operation including data de-compression, performed on the data transferred from the storage device to the memory, prior to data transfer to the peripheral interface.

11. A peripheral interface adapter in a data communication system for fast processing of a data transfer load, divided in individual data blocks, said processing optimizing the overlap of pipelined operations, including data transfers and post-processing performed on individual data blocks, said adapter connected to a bridge attached to an external bus connected to a data storage device, a main memory, and a main processor, said bridge connecting a processor, a post-processing module and a memory, said adapter comprising:
    an internal bus connected to a peripheral interface;
    a DMA channel connected to the internal bus assisting in the DMA transfer of individual data blocks; and
    a Transfer Progress Alert (TPA) module connected to the internal bus; wherein
    said internal bus transferring individual data blocks between the peripheral interface and the memory;
    said TPA module determining when each said transferred individual data block being ready for a post-processing operation in the post-processing module; and
    the pipelined operations occurring on different individual data blocks simultaneously, and including transferring incoming individual data blocks, at least one post-processing operation, and transferring the processed data, until all individual data blocks from the data transfer load are processed.

12. The adapter according to claim 11, wherein the TPA module further generating an interrupt alerting TPA control program instructions, executed in the processor, said control program instructions initializing the TPA module and the DMA pre-defined individual data block size and addresses in the DMA channel, and controlling the DMA channel.

13. The adapter according to claim 12, wherein the individual data blocks having customer-defined data being assigned to the internal bus addresses in a pre-determined address region, and said TPA module and control program instructions monitoring transfers in that particular address region and ignoring transfers in other address regions.

14. The adapter according to claim 13, wherein the TPA module comprises:
   a snoop function element for ignoring transfers out of the pre-determined address region;
   a snoop key register, wherein the snoop function element comparing transferred data address bits, corresponding to the pre-determined address region, with a key saved in the snoop key register;
   a data counter having the number of data bytes transferred;
   a packet counter incremented by one for each transferred individual data block, thus triggering generation of the interrupt alerting the TPA control program instructions to perform the post-processing operation; and
   an interrupt line transferring the interrupt and staying active until all individual data blocks from the data transfer load are post-processed.

15. The adapter according to claim 14, wherein the TPA module further comprises:
   an error detection module for performing an error detection operation on the customer-defined data transferred on the internal bus, for ascertaining the integrity of the transferred data.

16. The adapter according to claim 15, wherein the error detection operation including creation of a resultant checksum obtained by performing an EXCLUSIVE-OR (XOR) operation on the corresponding bits of the newly transferred data and a stored resultant checksum from the previous data transfers.

17. The adapter according to claim 11, wherein said external bus being a peripheral component interconnect (PCI) bus.

18. The adapter according to claim 11, wherein the peripheral interface being a ESCON interface.

19. The adapter according to claim 11, wherein the data communication system be a data storage medium server.

20. The adapter according to claim 11 wherein the post-processing operation including data reformatting.

21. The adapter according to claim 11, wherein the post-processing module having a data compression module and the post-processing operation including data compression, performed on the data transferred from the peripheral interface to the memory, prior to data transfer to the storage device.

22. The adapter according to claim 11, further comprises a second Transfer Progress Alert (TPA) module connected to the external bus, wherein the post-processing module having a data de-compression module and the post-processing operation including data de-compression, performed on the data transferred from the storage device to the memory, prior to data transfer to the peripheral interface.

23. A method for optimizing processing of a data transfer load, divided in individual data blocks, by simultaneously performing pipelined operations on different individual data blocks, thus optimizing the overlap of pipelined operations, said method being used in a data communication system and comprising the steps:
   (a) initializing the transfer with a pre-defined individual data block size and determining a key for selecting and monitoring transfers with transfer addresses within a pre-determined address region;
   (b) continuously repeating following steps until all monitored individual data blocks from the data transfer load are processed:
   (c) transferring incoming individual data blocks on a bus between a peripheral device and a memory,
   (d) monitoring in a Transfer Progress Alert (TPA) module, connected to the bus, the individual data blocks having transfer addresses determined to belong in the pre-determined address region;
   (e) determining in the TPA module when each said monitored transferred individual data block being ready for a post-processing operation;
   (f) generating an interrupt alerting TPA control program instructions to start the post-processing operation and keeping an interrupt line transferring the interrupt active, until all individual data blocks from the data transfer load are post-processed;
   (g) performing at least one post-processing operation; and
   (h) transferring the processed data to a peripheral storage device.

24. The method according to claim 23, further comprising a step for performing an error detection operation on the monitored individual data blocks transferred on the bus, for ascertaining the integrity of the transferred data.

25. The method according to claim 24, wherein the error detection operation including creation of a resultant checksum obtained by performing an EXCLUSIVE-OR (XOR) operation on the corresponding bits of the newly transferred data and a stored resultant checksum from the previous data transfers.

26. The method according to claim 23, wherein the data communication system being a data storage medium server.

27. The method according to claim 23, wherein the post-processing operation including data reformatting.

28. The method according to claim 23, wherein the post-processing operation including data compression, performed on the data transferred from the peripheral device into the memory.

29. The method according to claim 23, wherein the post-processing operation including data de-compression, performed prior to the data being transferred from the memory to the peripheral device.

30. The method according to claim 23, wherein the post-processing operation including data buffering.

* * * * *